United States Patent [19]

Almond

[11] Patent Number: 4,488,975

[45] Date of Patent: Dec. 18, 1984

[54] HIGH TEMPERATURE STABLE CROSSLINKED GEL FRACTURING FLUID

[75] Inventor: Stephen W. Almond, Duncan, Okla.

[73] Assignee: Halliburton Company, Duncan, Okla.

[21] Appl. No.: 449,094

[22] Filed: Dec. 13, 1982

[51] Int. Cl.³ .............................................. E21B 43/26
[52] U.S. Cl. .............................. 252/8.55 R; 166/308; 252/315.1; 252/315.3
[58] Field of Search ............ 252/8.5 A, 8.5 C, 8.55 R, 252/8.55 C, 315.3, 315.1

[56] References Cited

U.S. PATENT DOCUMENTS

| | | |
|---|---|---|
| 2,976,285 | 3/1961 | Gash . |
| 3,195,634 | 7/1965 | Hill . |
| 3,201,353 | 8/1965 | Corben . |
| 3,301,723 | 1/1967 | Chrisp ......................... 252/315.3 X |
| 3,310,112 | 3/1967 | Nielsen et al. . |
| 3,350,432 | 10/1967 | Stynes . |
| 3,368,627 | 2/1968 | Hurst . |
| 3,418,251 | 12/1968 | Stynes . |
| 3,664,422 | 5/1972 | Bullen . |
| 3,888,312 | 6/1975 | Tiner et al. ...................... 252/8.55 X |
| 3,980,136 | 9/1976 | Plummer et al. . |
| 4,021,355 | 5/1977 | Holtmyer et al. . |
| 4,257,903 | 3/1981 | Kucera et al. ......................... 252/8.5 |
| 4,313,834 | 2/1982 | Harris ................................. 252/8.55 |

FOREIGN PATENT DOCUMENTS 2055106  2/1981  United Kingdom ............... 252/8.55

*Primary Examiner*—Herbert B. Guynn
*Attorney, Agent, or Firm*—Robert A. Kent; Thomas R. Weaver

[57] ABSTRACT

The present invention provides a fracturing fluid composition and method for fracturing substerranean formations penetrated by a well bore. The fracturing fluid comprises an aqueous fluid, a gelling agent, a crosslinking agent comprising a zirconium chelate or an aluminum chelate and a sufficient quantity of carbon dioxide to reduce the pH of the fracturing fluid to a level below about 5.5. The fluid is injected into the formation through the well bore at a rate and pressure sufficient to create at least one fracture in the formation.

17 Claims, No Drawings

HIGH TEMPERATURE STABLE CROSSLINKED GEL FRACTURING FLUID

BACKGROUND OF THE INVENTION

1. Field of the Invention

The present invention relates generally to methods and compositions for fracturing subterranean formations penetrated by a well bore. More particularly, the present invention relates to methods and compositions for fracturing formations wherein a fracturing fluid containing up to about 95 percent carbon dioxide by volume is injected into a formation, with or without a propping agent suspended therein, through a well bore at a rate sufficient to open a fracture in the formation.

2. Description of the Prior Art

The treatment of subterranean formations penetrated by a well bore to stimulate the production of hydrocarbons therefrom or the ability of the formation to accept injected fluids has long been known in the art. One of the most common methods of increasing productivity of a hydrocarbon-bearing formation is to subject the formation to a fracturing treatment. This treatment is effected by injecting a gas, liquid or two-phase fluid down the well bore at sufficient pressure and flow rate to fracture the subterranean formation. Continued pumping of the fracturing fluid containing a propping agent, such as for example, sand, fine gravel, sintered bauxite, glass beads or the like into the fracture results in placement of the proppant within the fracture. Following the treatment, the fracturing fluid is recovered from the well bore or permitted to migrate from the fracture leaving the propping agent remaining in the fracture. The propping agent prevents the complete closure of the fracture to provide a flow channel through which an increased quantity of a hydrocarbon or other fluid can flow.

The conductivity of the propped fracture depends, among other things, on the size of the propping agent particles placed in the fracture. This, in turn, depends upon the width to which the particular fracture may be opened during injection of the fracturing fluid and this normally requires that such fluids have high viscosities. The use of fracturing fluids having high viscosities is advantageous since such fluids can support the propping agent particles suspended therein without excessive settling.

A traditional fracturing technique utilizes a water or oil-based fluid containing a gelling agent to fracture a hydrocarbon-bearing formation. To facilitate recovery of the fracturing fluid from the well bore, various improvements have been made in the fracturing techniques. One such improved technique is that known as foam fracturing. This process is described in, for example, U.S. Pat. No. 3,980,136. Briefly, that process involved generation of a foam of a desired "Mitchell quality" which then is introduced through a well bore into a formation which is to be fractured. Various gases and liquids can be used to create the foam, but foams generally used in the art are made from nitrogen and water, in the presence of a suitable surfactant. The pressure at which the foam is pumped into the well is such that it will cause a fracture of the hydrocarbon-bearing formation. Additionally, the foam comes out of the well easily when the pressure is released from the well head, because the foam expands when the pressure is reduced.

Yet another fracturing technique has been that utilizing a liquefied, normally gaseous fluid. U.S. Pat. No. 3,195,634, for example, discloses a method for treating a subterranean formation penetrated by a well bore with a composition comprising a liquid-liquid mixture of carbon dioxide and water. The carbon dioxide is present in an amount equivalent to from about 300 to about 1500 SCF at 80° F. and 14.7 psia per 42 gallons of water. The composition is injected into the formation under sufficient pressure to fracture the formation. The composition can include gelling agents and proppant materials. Upon pressure release at the well head, the liquid carbon dioxide vaporizes and flows from the formation.

U.S. Pat. No. 3,310,112 discloses a method of fracturing a subterranean formation penetrated by a well bore comprising introduction of a mixture of liquid carbon dioxide and a propping agent slurried in a suitable vehicle into the well bore at a pressure sufficient to fracture the formation. The liquid carbon dioxide is present in an amount sufficient to provide at least five volumes of carbon dioxide per volume of slurried propping agent. After injection of the liquid carbon dioxide containing the propping agent, the pressure on the well bore is released. The liquid carbon dioxide normally is heated sufficiently by the formation that upon pressure release, the liquid changes to a gas. A substantial portion of the carbon dioxide then leaves the well and forces or carries out with it an appreciable amount of the oil or aqueous vehicle utilized to transport the proppant.

U.S. Pat. No. 3,368,627 discloses a method of treating a formation penetrated by a well bore which consists essentially of injecting down the well bore a fluid azeotropic mixture which has a critical temperature sufficiently high or a critical pressure sufficiently low to remain a liquid at the temperature and pressure existing during injection and treatment of the formation. The fluid mixture has critical properties such that a substantial portion of the injected fluid is converted to a gas upon a release of the pressure applied to the liquid during injection into the formation. The fluid mixture consists essentially of carbon dioxide and at least one $C_2$ to $C_6$ hydrocarbon.

U.S. Pat. No. 3,664,422 discloses a method of treating a subsurface earth formation penetrated by a well bore comprising injection of a liquefied gas together with a gelled alcohol into the formation at a pressure sufficient to fracture the formation. The liquefied gas is returned from the formation by vaporization following pressure reduction on the well bore. The gelled alcohol is removed by vaporization during subsequent production from the well leaving only the broken gelling agent in the formation.

It would be desirable to provide a method by which a viscous fluid can be created which includes carbon dioxide to facilitate fluid recovery and which is stable over a broad temperature range and particularly elevated temperatures and is capable of carrying high concentrations of proppant into a subterranean formation.

SUMMARY OF THE INVENTION

The present invention relates to methods and fluids for forming fractures in subterranean formations penetrated by a well bore and transporting increased concentrations of proppant material into the formation penetrated by the well bore. The methods and fluids permit increased penetration of the formation by the fluids together with low fluid leak-off to the formation and exhibit the capability of carrying high concentrations of proppant material without significant proppant settling in the fracturing fluid. The fracturing fluid of the present invention comprises an aqueous fluid, a gelling agent, a crosslinking agent and a quantity of carbon dioxide in an amount sufficient to reduce the pH of the fracturing fluid to a level below about 5.5. The reduction in the pH of the fluid by the addition of the carbon dioxide, controllably activates the crosslinking agent. The fluid is introduced into a subterranean formation through a well bore penetrating the formation at a sufficient rate and under sufficient pressure to create at least one fracture in the formation. A propping agent can be included in the fracturing fluid.

DESCRIPTION OF THE PREFERRED EMBODIMENT

The present invention relates to methods and fracturing fluid compositions for fracturing subterranean formations penetrated by a well bore. The fracturing fluid comprises an aqueous fluid, a gelling agent, a crosslinking agent and a quantity of carbon dioxide.

The aqueous fluid can comprise substantially any aqueous solution which does not adversely react with the constituents of the fracturing fluid, the formation or fluids present therein. The aqueous fluid can comprise, for example, fresh water, natural brines or artificial brines such as potassium chloride solutions, sodium chloride solutions, calcium chloride solutions and the like. Normally, the aqueous fluid will have a substantially neutral pH or be only slightly acidic or alkaline such as in a pH range of from about 6 to 8. In the event the pH of the aqueous fluid is below this range, it can be adjusted to a pH of at least 6 by means well known in the art.

The gelling agent can comprise, for example, hydratable polymers such as cellulose, karaya, xanthan, tragacanth, gum ghatti, carrageenin, psyllium, gum acacia and carboxyalkylguar, carboxyalkylhydroxyalkylguar, carboxyalkylcellulose, carboxyalkylhydroxyalkylcellulose and the like wherein said alkyl radicals can comprise methyl, ethyl or propyl radicals.

Hydratable synthetic polymers and copolymers which can be utilized in accordance with the present invention include, but are not limited to, polyacrylate, polymethacrylate, acrylamide-acrylate copolymers and maleic anhydride methylvinyl ether copolymers.

The gelling agent is admixed with the aqueous fluid in any suitable mixing apparatus in an amount of from about 10 pounds to about 100 pounds per 1,000 gallons of aqueous fluid. Preferably, the gelling agent is admixed with the aqueous fluid in an amount of from about 20 to about 60 pounds per 1,000 gallons of aqueous fluid. Solvation of the gelling agent in the mixing apparatus results in the formation of a base gel.

The crosslinking agent of the present invention comprises a zirconium chelate which features zirconium in the +4 oxidation state or an aluminum chelate which features aluminum in the +3 oxidation sate. Examples of zirconium chelates which can be used in the practice of the present invention include zirconium acetylacetonate chelate, zirconium lactate chelate, zirconium acetate chelate and the like. Examples of aluminum chelates which can be used in the practice of the present invention include aluminum acetylacetonate chelate, aluminum lactate chelate and aluminum acetate chelate. The preferred crosslinking agents are zirconium acetylacetonate chelate and aluminum acetate chelate.

The crosslinking agent is admixed with the base gel in an amount in the range of from about 0.01 pound to about 10 pounds per 1,000 gallons of aqueous fluid employed. Preferably, the crosslinking agent is admixed with the base gel in an amount of from about 0.025 to about 2.5 pounds per 1,000 gallons of aqueous fluid. The crosslinking agent can be admixed with the base gel in any suitable mixing apparatus. The crosslinking agent generally does not crosslink the base gel to any significant extent until the pH of the fluid is lowered to a level in the range of below about 5.5 and preferably below about 4.0. The crosslinking agent can be admixed with the aqueous fluid as a particulate solid or a liquid solution by dissolution in a suitable solvent such as water or an alcohol.

Carbon dioxide is admixed with the base gel in an amount sufficient to reduce the pH of the fracturing fluid to a level below about 5.5. Preferably, sufficient carbon dioxide is admixed with the base gel to reduce the pH of the fluid to a level below about 4.0. The carbon dioxide can be admixed with the base gel in an amount sufficient to comprise up to about 95 percent by volume of the fracturing fluid. The carbon dioxide can be admixed with the base gel in a pressurized mixer or other suitable apparatus such as a static mixer or the like. The carbon dioxide can be admixed with the base gel prior to or after admixing of the crosslinking agent with the base gel. Surprisingly, it has been found that as a result of the practice of the present invention, a smooth or lump-free crosslinked gel fracturing fluid can be produced which can carry significant quantities of a propping agent without significant settling of the propping agent occurring in the fluid.

By way of contrast, when an attempt is made to reduce the pH of the base gel to a level in the range of about 3.0 to 4.0 with, for example a mineral acid, such as hydrochloric acid, sulfuric acid, or an organic acid such as formic or acetic acid, or the like to activate the crosslinking agent, a lumpy fluid results in which the crosslinked gelling agent has precipitated as a result of syneresis. While the specific mechanism presently is unknown, it is believed that the carbonate, which is contained in the aqueous fluid solution as a result of the addition of the carbon dioxide to the aqueous fluid, interacts with the crosslinking agent to regulate or moderate the rate of the crosslinking reaction between the crosslinking agent and the gelling agent to avoid the formation of any undesirable gelling agent precipitates within the fracturing fluid. Further, the gelled fluid which is formed is found to have significant high temperature stability against premature fluid breakdown. That is, the fluid has been found to be relatively shear stable at temperatures in excess of about 150° F.

The propping agent which can be admixed with the fracturing fluid can comprise any of those materials which have been or are found to be suitable for propping a fracture in a subterranean formation. The propping agent can comprise, for example, sand, graded gravel, glass beads, sintered bauxite, resin-coated sand or the like. Preferably, the propping agent is admixed with the fracturing fluid after addition of the carbon dioxide and crosslinking agent to facilitate pumping and transport of the fluid. However, the propping agent can be admixed with the base gel if desired.

The amount of proppant admixed with the crosslinked gelled fracturing fluid may be varied to provide substantially any desired amount of proppant material. The propping agent can be admixed with the fracturing fluid in an amount of from about zero pounds of proppant per gallon of aqueous liquid up to about as many pounds of proppant material as may be pumped. Depending upon formation reservoir conditions, the amount of propping agent transported by the fracturing fluid into the fracture created in the subterranean formation generally can be in the range of from about ½ pound to about 20 pounds per gallon of fracturing fluid.

The crosslinked gel fracturing fluid of the present invention is used by pumping the fluid into a well bore penetrating the subterranean formation sought to be fractured. The fracturing fluid is pumped at a rate and pressure sufficient to create at least one fracture in the subterranean formation. The propping agent then can be placed in the created fracture by further pumping of the fluid containing propping agent.

After the introduction of the full amount of the calculated or estimated volume of fracturing fluid necessary to fracture the formation and transport the proppant material, the well bore is shut-in for a period of time sufficient to permit stabilization of the formation. Normally, the well is shut-in for a period of time sufficient to permit the formation to at least partially close upon the proppant material and stabilize the fracture volume. The shut-in period can be from several minutes to in excess of about 12 hours and, preferably, is in the range of from about 1 to 2 hours. After the subterranean formation has stabilized, the well is opened under controlled conditions and the pressure drop in the well bore causes the carbon dioxide to move back toward the well bore. The carbon dioxide moves from the formation into the well bore and exits the well bore at the surface. In the event a sufficient quantity of carbon dioxide is employed, the carbon dioxide can carry from the formation substantially all of the liquids present in the fracturing area which leaves the formation and well clean and ready for the commencement of production. Typically, if the carbon dioxide is present in an amount of greater than about 15 percent by volume of the fluid, significant clean out will occur.

Once the fracture has been formed and propped in the subterranean formation, it is desirable to "break" the gelled fluid into a fluid having a lower viscosity to facilitate removal from the formation. There are various means available for breaking the fracturing fluid of the present invention. Most of the fracturing fluids will break into a low viscosity fluid as a result of time and temperature effects on the gel. However, it often is desirable to have a predictable breaking time within relatively narrow limits. Therefore, breakers may be included in the fracturing fluid of the present invention, if desired. Mild oxidizing agents are useful breakers in fracturing fluids utilized in elevated temperature formations. Suitable oxidizing agents, for example, are ammonium persulfate, sodium persulfate and organic peroxides. For fracturing fluids used at relatively low formation temperatures, such as below 140° F., enzymes generally can be used as breakers. Suitable enzymes for such use are alpha and beta amylases, invertase, maltase, cellulase, amyloglucosidase, oligoglucosidase, and hemicellulase.

To further illustrate the method of the present invention, and not by way of limitation, the following examples are provided.

EXAMPLE I

The following tests are performed to facilitate comparison of the composition of the present invention with other crosslinked fluids. A number of samples are prepared by admixing sufficient gelling agent comprising carboxymethylhydroxyethylcellulose with a 2% potassium chloride solution to form a base gel containing 0.48 percent by weight gelling agent. A crosslinking agent comprising zirconium oxychloride or a crosslinking agent of the present invention comprising either zirconium acetylacetonate chelate or aluminum acetate chelate then is admixed with the base gel. The pH of the base gel then is adjusted to activate the crosslinking agent. The results of the tests are set forth in Table I, below:

TABLE I

CROSSLINKING TEST

| Test No. | Crosslinking Agent | Crosslinking Agent Concentration, % by Weight | pH Adjusting Agent | Fluid pH | Crosslinking Time, Seconds | Crosslinked Fluid Description |
| --- | --- | --- | --- | --- | --- | --- |
| 1 | Zirconium oxychloride | 0.01 | HCl | 2.5 | 35 | Very grainy, chunky white gel precipitate |
| 2 | Zirconium oxychloride | 0.01 | Acetic acid + HCl | 3.43 | 15 | Grainy, white gel precipitate |
| 3 | Zirconium oxychloride | 0.01 | $CO_2$ | 3.52 | 15 | Grainy, white gel precipitate |
| 4 | Zirconium acetylacetonate chelate | 0.06 | Acetic acid | 3.56 | 25 | Grainy, white gel precipitate, shear sensitive |
| 5 | Zirconium acetylacetonate chelate | 0.03 | HCl | 3.46 | 45 | Grainy, white gel precipitate, shear sensitive |
| 6 | Zirconium acetylacetonate chelate | 0.06 | $CO_2$ | 3.52 | 30 | Smooth crosslinked gel, no precipitate present |
| 7 | Zirconium acetylacetonate chelate | 0.03 | $CO_2$ | 3.52 | 30 | Smooth crosslinked gel, no precipitate present |
| 8 | Aluminum acetate chelate | 0.012 | $CO_2$ | 3.52 | 45 | Smooth crosslinked ge., no precipitate present |

The results of the tests clearly illustrate the superior quality of a crosslinked gel produced in accordance with the methods of the present invention.

EXAMPLE II

The following tests were performed to illustrate the dynamic properties of the fluid compositions of the present invention. In each test, a sample of a base gel is prepared by admixing sufficient gelling agent comprising carboxymethylhydroxyethylcellulose with a 2% potassium chloride solution to form a base gel containing a 0.48 percent by weight gelling agent. The fluid was permitted to hydrate for about 30 minutes after which time the crosslinking agent is added and the fluid is rapidly mixed for approximately 15 seconds at ambient pressure. The fluid then is pumped through a recirculating loop at 1,000 psi. After 10 minutes a sweep measurement of shear rate versus shear stress is taken to permit calculation of initial $N'$ and $k_p'$ values and to measure the apparent viscosity. A quantity of carbon dioxide then is introduced into the fluid to provide a concentration of about 20% by weight of the fluid. The fluid then is circulated for about 10 minutes to permit the fluid to crosslink and equilibrium conditions to be achieved. The sweep of shear rate versus shear stress then is repeated. The data is set forth in Table II, below:

TABLE II

DYNAMIC FLUID PROPERTIES

| Test No. | Crosslinking Agent | Crosslinking Agent Concentration, % by Weight | Additional Additives, % by Weight | N' | $k_p$(lb/ft$^2$) | Apparent Viscosity cp at 170 sec$^{-1}$ |
|---|---|---|---|---|---|---|
| 1 | Zirconium lactate chelate | 0.16 | 0.09 NaHCO$_3$ | 0.60 | 0.0068 | 42 |
| 2 | Zirconium lactate chelate | 0.16 | 0.09 NaHCO$_3$ 20.0 CO$_2$ | 0.46 | 0.035 | 105 |
| 3 | Zirconium acetylacetonate chelate | 0.18 | 0.09 NaHCO$_3$ | 0.65 | 0.0054 | 43 |
| 4 | Zirconium acetylacetonate chelate | 0.18 | 0.09 NaHCO$_3$ 20.0 CO$_2$ | 0.50 | 0.026 | 95 |
| 5 | Aluminum acetate chelate | 0.24 | 0.06 NaHCO$_3$ | 0.38 | 0.030 | 59 |
| 6 | Aluminum acetate chelate | 0.24 | 0.06 NaHCO$_3$ 20.0 CO$_2$ | 0.15 | 0.44 | 268 |

While that which presently is considered to be the preferred embodiment of the invention has been described herein, it is to be understood that changes and modifications can be made in the compositions and methods disclosed by an individual skilled in the art without departing from the spirit or scope of the invention as set forth in the appended claims.

What is claimed is:

1. A crosslinked gel fracturing fluid consisting essentially of:
   an aqueous fluid;
   a gelling agent comprising at least one member selected from the group consisting of karaya, xanthan, tragacanth, gum ghatti, carrageenin, psyllium, gum acacia, carboxyalkylguar, carboxyalkylhydroxyalkylguar, carboxyalkylcellulose, carboxyalkylhydroxyalkylcellulose wherein said alkyl radicals are methyl, ethyl or propyl radicals, polyacrylates, polymethacrylates, acrylamide-acrylate copolymers and maleic anhydride-methyl vinyl ether copolymers present in an amount of from about 10 pounds to about 100 pounds per 1,000 gallons of aqueous fluid;
   a crosslinking agent selected from the group consisting of zirconium chelates which features zirconium in the +4 oxidation state and aluminum chelates which feature aluminum in the +3 oxidation state present in an amount of from about 0.01 to 10 pounds per 1,000 gallons of aqueous fluid; and
   a sufficient quantity of carbon dioxide to reduce the pH of said fracturing fluid to a level below about 5.5 whereby said gelling agent is caused to be controllably crosslinked by said crosslinking agent without significant syneresis of said crosslinked gel occurring.

2. The composition of claim 1 wherein said chelate is present in an amount of from about 0.025 pound to about 2.5 pounds per 1,000 gallons of aqueous fluid.

3. The composition of claim 1 wherein said chelate is zirconium acetylacetonate chelate.

4. The composition of claim 1 wherein said chelate is aluminum acetate chelate.

5. The composition of claim 1 defined further to include a propping agent.

6. The composition of claim 1 wherein said carbon dioxide comprises up to about 95 volume percent of said fracturing fluid.

7. The composition of claim 1 wherein sufficient carbon dioxide is present to reduce the pH of said fracturing fluid to a level below about 4.0.

8. The composition of claim 1 wherein the chelate is zirconium lactate chelate.

9. A method of fracturing a subterranean formation penetrated by a well bore comprising:
   contacting said subterranean formation with a fracturing fluid introduced into said formation by injection into said well bore at a rate and pressure sufficient to create at least one fracture in said subterranean formation upon contact therewith, said fracturing fluid consisting essentially of:
   an aqueous fluid;
   a gelling agent comprising at least one member selected from the group consisting of karaya, xanthan, tragacanth, gum ghatti, carrageenin, psyllium, gum acacia, carboxyalkylguar, carboxyalkylhydroxyalkylguar, carboxyalkylcellulose, carboxyalkylhydroxyalkylcellulose wherein said alkyl radicals are methyl, ethyl or propyl radicals, polyacrylates, polymethacrylates, acrylamide-acrylate copolymers and maleic anhydride-methyl vinyl ether copolymers present in an amount of from about 10 pounds to about 100 pounds per 1,000 gallons of aqueous fluid;
   a crosslinking agent comprising at least one member selected from the group consisting of zirconium chelates which features zirconium in the +4 oxidation state and aluminum chelates which feature aluminum in the +3 oxidation state present in an amount of from about 0.01 to 10 pounds per 1,000 gallons of aqueous fluid; and a sufficient quantity of carbon dioxide to reduce the pH of said fracturing fluid to a level below about 5.5 to cause said crosslinking agent to controllably crosslink said hydrated gelling agent without signficant syneresis of said crosslinked gel occurring to form said fracturing fluid.

10. The method of claim 9 wherein said chelate is zirconium acetylacetonate chelate.

11. The method of claim 9 wherein said fracturing fluid is defined further to include a propping agent.

12. The method of claim 11 wherein said propping agent is present in an amount of from about ½ to about 20 pounds per gallon of fracturing fluid.

13. The method of claim 9 wherein said chelate is present in an amount of from about 0.025 pound to about 2.5 pounds per 1,000 gallons of aqueous fluid.

14. The method of claim 9 wherein said chelate is aluminum acetate chelate.

15. The method of claim 9 wherein the chelate is zirconium lactate chelate.

16. The method of claim 9 wherein sufficient carbon dioxide is present to reduce the pH of said fracturing fluid to a level below about 4.0.

17. A method of preparing a crosslinked gelled fluid for use in fracturing treatments of subterranean formations without significant syneresis of said crosslinked gelled fluid occurring consisting of:

admixing an aqueous fluid;

a gelling agent comprising at least one member selected from the group consisting of karaya, xanthan, tragacanth, gum ghatti, carrageenin, psyllium, gum acacia, carboxyalkylguar, carboxyalkylhydroxyalkylguar, carboxyalkylcellulose, carboxyalkylhydroxyalkylcellulose wherein said alkyl radicals are methyl, ethyl or propyl radicals, polyacrylates, polymethacrylates, acrylamide-acrylate copolymers and maleic anhydride-methyl vinyl ether copolymers;

a crosslinking agent comprising at least one member selected from the group consisting of zirconium chelates which features zirconium in the +4 oxidation state and aluminum chelates which feature aluminum in the +3 oxidation state present in an amount of from about 0.01 to 10 pounds per 1,000 gallons of aqueous fluid; and a sufficient quantity of carbon dioxide to reduce the pH of said gelled fluid to a level below about 5.5 to activate said crosslinking agent and effect a controllable crosslinking of said gelling agent by said crosslinking agent to form said crosslinked gelled fluid without significant syneresis of said gelled fluid occurring.

* * * * *